United States Patent
Dey et al.

(10) Patent No.: US 11,593,013 B2
(45) Date of Patent: Feb. 28, 2023

(54) MANAGEMENT OF DATA IN A HYBRID CLOUD FOR USE IN MACHINE LEARNING ACTIVITIES

(71) Applicant: KYNDRYL, INC., New York, NY (US)

(72) Inventors: Kuntal Dey, New Delhi (IN); Seema Nagar, Bangalore (IN); Pramod Vadayadiyil Raveendran, Bengaluru (IN); Sougata Mukherjea, New Delhi (IN)

(73) Assignee: Kyndryl, Inc., New York, NY (US)

( * ) Notice: Subject to any disclaimer, the term of this patent is extended or adjusted under 35 U.S.C. 154(b) by 663 days.

(21) Appl. No.: 16/594,227

(22) Filed: Oct. 7, 2019

(65) Prior Publication Data

US 2021/0103479 A1 Apr. 8, 2021

(51) Int. Cl.
| | |
|---|---|
| *G06F 3/06* | (2006.01) |
| *G06N 20/00* | (2019.01) |
| *H04L 47/78* | (2022.01) |
| *G06Q 10/06* | (2012.01) |
| *H04L 41/0823* | (2022.01) |
| *G06N 3/08* | (2006.01) |
| *H04L 9/40* | (2022.01) |
| *G06Q 10/0635* | (2023.01) |

(52) U.S. Cl.
CPC .......... *G06F 3/0647* (2013.01); *G06F 3/0649* (2013.01); *G06N 3/08* (2013.01); *G06N 20/00* (2019.01); *G06Q 10/0635* (2013.01); *H04L 41/0823* (2013.01); *H04L 47/788* (2013.01); *H04L 63/105* (2013.01)

(58) Field of Classification Search
CPC ... H04L 12/14; H04L 12/141; H04L 12/1421; H04L 29/06823; H04L 29/0685; H04L 67/1023; H04L 41/0823; H04L 41/0826; H04L 41/083; H04L 47/788; G06F 3/0647; G06F 3/0649; G06F 16/119; G06F 16/122; G06F 16/2458; G06F 9/5016; G06F 9/5027; G06N 3/08; G06N 20/00; G06Q 10/0635; G06Q 10/06375
See application file for complete search history.

(56) References Cited

U.S. PATENT DOCUMENTS

| | | | |
|---|---|---|---|
| 9,355,256 B2 | 5/2016 | Chari | |
| 9,600,684 B2 | 3/2017 | Cherel | |
| 10,311,467 B2 * | 6/2019 | Ghavamzadeh | ... G06Q 30/0269 |
| 2016/0171682 A1 | 6/2016 | Abedini | |

(Continued)

OTHER PUBLICATIONS

Mell et al., "The NIST Definition of Cloud Computing", Recommendations of the National Institute of Standards and Technology, Special Publication 800-145, Sep. 2011, 7 pages.

(Continued)

*Primary Examiner* — Joshua Kading
(74) *Attorney, Agent, or Firm* — John Kennel; Andrew M. Calderon; Calderon Safran & Cole, P.C.

(57) ABSTRACT

Managing hybrid cloud resources by grouping at least a portion of the elements of a data set according to attribute sensitivity into a cluster of elements, computing a resource allocation impact of the cluster of elements, computing an information gain associated with the set of elements, and allocating cloud resources according to the resource allocation impact and information gain.

20 Claims, 5 Drawing Sheets

(56) References Cited

U.S. PATENT DOCUMENTS

| | | |
|---|---|---|
| 2017/0063952 A1 | 3/2017 | Barsness |
| 2017/0118273 A1 | 4/2017 | Hipsh |
| 2017/0171248 A1 | 6/2017 | Li |
| 2018/0144244 A1* | 5/2018 | Masoud ................ G06N 3/105 |
| 2018/0197087 A1* | 7/2018 | Luo ....................... G06N 20/00 |
| 2018/0197111 A1 | 7/2018 | Crabtree |
| 2018/0293498 A1 | 10/2018 | Campos |
| 2018/0336486 A1 | 11/2018 | Chu |
| 2019/0288915 A1* | 9/2019 | Denyer ................ G06F 9/5077 |
| 2020/0050769 A1* | 2/2020 | Bhosale ............... G06F 3/0647 |
| 2020/0380367 A1* | 12/2020 | Gupta .................. G06K 9/6271 |

OTHER PUBLICATIONS

Osia et al., "A Hybrid Deep Learning Architecture for Privacy-Preserving Mobile Analytics", arXiv:1703.02952v6 [cs.LG] May 8, 2019, 12 pages.

Qiao et al., "StackInsights: Cognitive Learning for Hybrid Cloud Readiness", arXiv:1712.06015v1 [cs.LG] Dec. 16, 2017, 11 pages.

Thomas, John, "3 Scenarios for Machine Learning on Multicloud", Dec. 20, 2017, 5 pages, <https://medium.comi/nside-machine-learning/3-scenarios-for-machine-learning-on-multicloud-c850fb8bed8f>.

* cited by examiner

MANAGEMENT OF DATA IN A HYBRID CLOUD FOR USE IN MACHINE LEARNING ACTIVITIES

BACKGROUND

The disclosure relates generally to managing hybrid cloud resources for application execution. The disclosure relates particularly to distributing machine learning and data storage activities in a hybrid cloud structure.

Distributed hybrid cloud systems including multiple distinct entities bound together by application software are well known. Such systems allow machine learning activities to be distributed such that the learning activities occur in one entity of the hybrid cloud while the data associated with the learning activities is stored in another entity of the hybrid cloud. Learning activities often occur in a public cloud entity while data is stored in a private cloud entity. Such hybrid cloud systems enable users to leverage the extensive resources afforded by public cloud entities while maintaining control over the security of their data.

SUMMARY

Aspects of the invention disclose methods, systems and computer readable media associated with managing hybrid cloud resources by grouping at least a portion of the elements of a data set according to attribute sensitivity into a cluster of elements, computing a resource allocation impact of the set of elements, computing an information gain of the set of elements, and allocating cloud resources according to the resource allocation impact and information gain.

DETAILED DESCRIPTION

Figure 1:
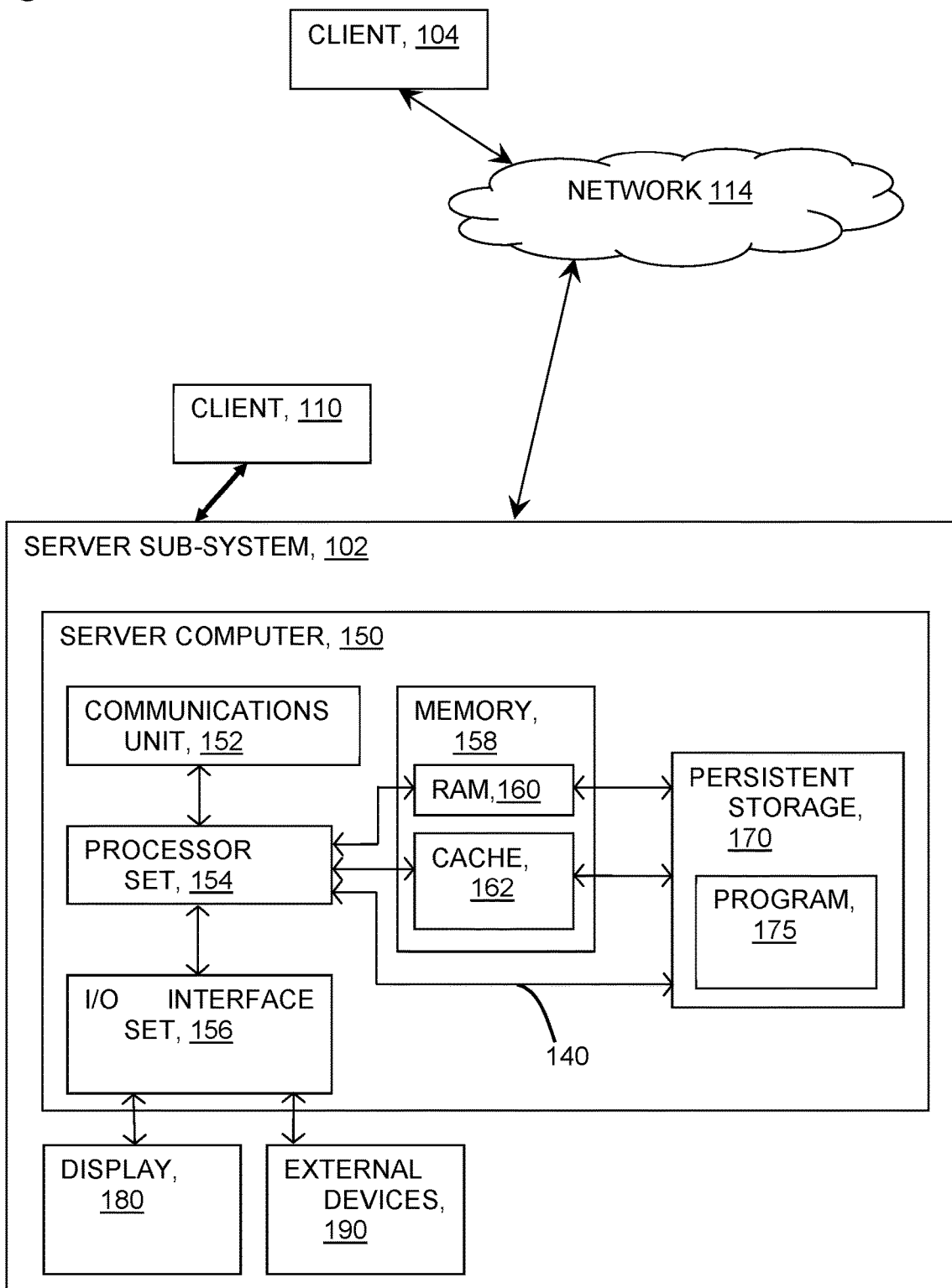
FIG. 1 provides a schematic illustration of a system, according to an embodiment of the invention.

Hybrid cloud system including public and private cloud entities provide users access to the resources of the public cloud without the need to relinquish control over their data and its security. Such hybrid systems provide the computational resources necessary for machine learning tasks utilizing big data sets with millions or billions of rows and columns of data. Processing the data as part of the machine learning activities requires passing the data, in some form, from the private to the public cloud. Such transfers include impacts to the user in terms of transfer and processing costs for the transferred data and also in terms of the risks to sensitive data of the user transferred to the public cloud for machine learning or other tasks.

In an embodiment, user data includes documents or other data defined by a set of data attributes. In this embodiment, the set of attributes includes a sensitivity value for the data. The sensitivity value relates to the confidentiality of the data as well as a user's desires to maintain the security of the data to maintain a business advantage through the data remaining confidential, or for regulatory reasons such as a company privacy policy covering the data, or the General Data Protection Regulations (GDPR).

Current systems utilize public cloud resources for machine learning and other activities while maintaining data sets on user controlled private cloud resources. Enabling access to additional data may improve machine learning model performance while increasing security risks associated with exposing the data. What is needed is a method to evaluate machine learning model performance enhancements associated with moving portions of data sets from private cloud storage to public cloud machine learning activities.

In an embodiment, a hybrid cloud system includes private cloud resources including data storage resources, and public cloud resources including machine learning resources. In this embodiment, the method transfers data from the private resources to the public resources for use in the machine learning activities such as analyzing big data sets for data based insights. The transfer of data to the public cloud resources carries a cost in terms of the actual system charges associated with moving data between the private and public cloud, and also carries a risk to the user in terms of the potential loss of data security during the transfer and after the data is present in the public cloud entity.

In this embodiment, the user potentially gains a better trained machine learning model, or a more fully developed insight from the big data analysis due to the use of an expanded data set. The disclosed inventions optimize the transfer of data from private to public to achieve the highest level of information gain in the public cloud machine learning activities per unit attribute transferred to the public cloud entity.

In an embodiment, the method analyzes a data set stored in private cloud resources to cluster the data according to matched data attributes. In an embodiment, the data set includes documents and information. The documents and information include many attributes. Each attribute includes a sensitivity indicating the sensitivity toward public disclosure of the attribute. Confidential documents and information are highly sensitive toward public exposure and have a higher sensitivity attributes than previously published documents and information. In this embodiment, the sensitivity of each data set element attribute is pre-defined externally and provided along with the data as it is placed in the data set.

In an embodiment, the data set element attributes lack a defined sensitivity value. In this embodiment, the method determines a sensitivity value for the data set element attributes. The method determines the value according to matching other attributes associated with the data set element. In this embodiment, the method matches attributes of an element having an unknown sensitivity attribute value with other elements having either a predefined sensitivity value a value previously determined by a similar attribute matching activity. In this embodiment, the method parses the elements using a natural language processor algorithm to identify phrases and concepts present in the element attributes. In this embodiment, the method stores such phrases and concepts as attributes associated with the element. The method then seeks matches among these attributes with similarly derived attributes for new element attributes lacking a sensitivity value. In an embodiment, the method computes the mean sensitivity value for all element attributes matching the new element attribute and assigns the computed mean sensitivity to the new element attribute. In an embodiment, the method computes a mean sensitivity value from the sensitivity values of all element attributes matching more than a defined threshold of element attributes. One of skill in the art will recognize that such threshold values can be set to increase or decrease the size of the set of matching elements.

In an embodiment, the method uses a soft rather than a hard word matching algorithm when seeking matches. The soft matching algorithm accounts for word order differences, misspellings, and other minor deviations in actual text unrelated to textual meaning. In this embodiment, the method uses the machine learning text matching algorithm WORD2VEC, to seek matches. (Note: the term "WORD2VEC" may be subject to trademark rights in various jurisdictions throughout the world and are used here only in reference to the products or services properly denominated by the marks to the extent that such trademark rights may exist.)

In an embodiment, for elements having pre-defined sensitivity values as well as elements having values determined according to the disclosed inventions, the sensitivity attribute values comprise a binary system of 0 and 1. The sensitivity of each element is either 0 or 1 and the method categorizes all data set elements as members of one of these two sensitivity segments. In an embodiment, the values range cross a scale from a minimum value to a maximum value, e.g., from 0 to 1, 0 to 100, etc. In this embodiment, the method divides the scale of sensitivity values into segments and the attribute value of each data set element determines the association of a data set element with a segment. In this embodiment, the method defines the segments as regular portions of either the scale itself, a third, quarter, fifth, etc., of the scale, or a regular portion of the population of elements, a third, quarter, fifth, etc., of the overall element population in each segment. In this embodiment, the method defines segments after the method has determined the sensitivity values of all data set elements lacking values. Each of the defined segments constitutes a class of data elements having similar attributes. The method considers all members of each class to have the same sensitivity.

In an embodiment, the method computes the resource allocation impact of transferring each data cluster. The method computes the impact with consideration for the sensitivity, and size of the data cluster, the cost of transferring data, and the degree of trust in the public cloud resource. The impact increases with sensitivity due to the increased impact of losing control of the information. The method considers lost business opportunities, data breach costs, and lost confidentiality privileges as part of the sensitivity impact upon transfer cost. Data transfer cost increases as the size of the data cluster increases as transfer rates depend upon the amount of data moved. The impact increases as the inverse of the trust in the cloud resource. Cloud resource entity trust levels are associated with historical data regarding entity data breaches, entity security protocols, software types and versions, hardware types and versions—high security hardware or security exploit vulnerable hardware, etc., and encryption schemes—encryption during transfer and in place etc. In this embodiment, the method computes the overall impact of a contemplated transfer of a set of clusters as the sum of the impact associated with each cluster transfer, with each cluster transfer impact equal to: cluster sensitivity*cluster size*cost of data transfer*(1/trust of public cloud entity). In an embodiment, the method computes the transfer impact for each cluster and for each combination of clusters.

In an embodiment, the method determines the information gain associated with the transfer of each cluster to the public cloud entity, and the use of the cluster in public cloud entity-based machine learning activities. In this embodiment, the machine learning activities include neural network training and use, Bayesian belief network development, supervised learning, anomaly detection, data tensor calculation and use, and other artificial intelligence activities as are known in the art. In an embodiment, the method determines the information gain from transferring and using a data cluster or set of data clusters. In this embodiment, the method determines information gain as the Kullback-Leibler divergence representing the amount of change in the calculated information gain between an initial probability distribution and a subsequent probability distribution. In this embodiment, the method calculates an initial probability distribution for the public cloud-based data set, prior to the transfer of any additional clusters. In this embodiment, the method calculates the subsequent probability distribution for the initial data set expanded by the cluster(s) contemplated for transfer. The method computes the information gain as the difference between the two probability distributions. In an embodiment, the method computes the information gain for each data element of a cluster in the data set. In this embodiment, the method computes the information gain for the cluster as the mean of the information gains of the respective data elements of the cluster. In this embodiment, the method computes the information gain for each cluster and combination of clusters. In this embodiment, the method computes the information gain for a combination of clusters as the mean of the information gains of the clusters of the combination.

In an embodiment, the method optimizes the transfer of data clusters to the public cloud entity. In this embodiment, the method creates a reinforcement learning problem with a state space and an agent. In this embodiment, the method defines each state of the state space as a cluster or combination of clusters. In an embodiment, the method allows the agent to start at any defined state and defines the action of the agent as the transfer of the cluster(s) of the state to the public cloud entity. In this embodiment, the method determines the information gain/impact ratio for each action. In this embodiment, the method analyzes the information gain/impact ratios to identify the optimum action in terms of the highest information gain/cost ratio value.

Example

A data set contains a collection of documents. Some documents are marked and include an attribute of "Attorney—Client Privileged" and have a sensitivity of 1. Some are marked and have the attribute: "Confidential" and have no sensitivity attribute value. There are documents marked and having the attribute "Highly Confidential", some of which have a sensitivity value of 1 and some of which lack a sensitivity value. The method parses the documents and matches the "Highly Confidential" attributes with each other. The method sets a sensitivity attribute value to 1 for those "Highly Confidential" attributes lacking a sensitivity value. The method reviews internal company information security guidelines and associates "Confidential" with a sensitivity of 0.5. The method then assigns a sensitivity of 0.5 to the "Confidential" attributes. The method then groups all attributes having a sensitivity value of 1 into a single cluster, and groups those attributes having a sensitivity of 0.5 into a second cluster. The method then computes a cost of transferring each of the clusters to the public cloud according to the size of the cluster, the sensitivity values and the trust of the public cloud resources (cloud trust equals 1 for this example). The method computes the information gain from adding the cluster to the machine learning data set in the public cloud and determines that the information gain associated with the transfer of the sensitivity 0.5 cluster is worthwhile in view of the impact of the transfer. The method determines that transferring the sensitivity 1 cluster is not worthwhile due to a lower information gain/transfer impact ratio arising from the higher sensitivity value of the cluster. The method then transfers the sensitivity 0.5 cluster to the public cloud for use by the machine learning element.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise resource allocation program (not shown) together with sufficient computing resource (processor, memory, network communications hardware) to execute the program. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the resource allocation program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., resource allocation program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
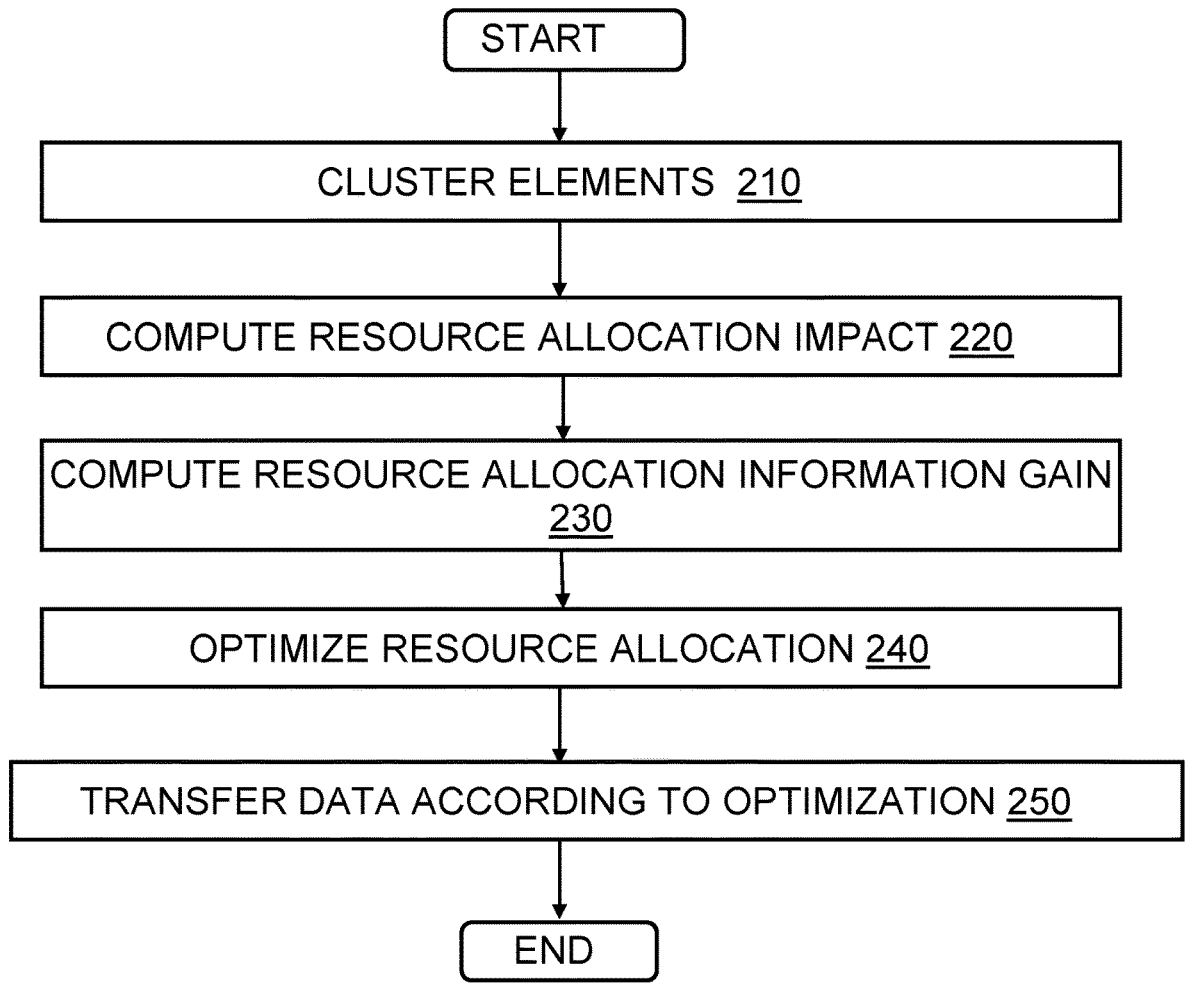
FIG. 2 provides a flowchart depicting an operational sequence, according to an embodiment of the invention.

FIG. 2 provides a flowchart 200, illustrating exemplary activities associated with the practice of the disclosure in allocating resources and activities between multiple entities of the hybrid cloud. In an embodiment, the method allocates resources between private and public cloud entities. In an embodiment, the method evaluates the ramification of moving all or part of a data set between private and public cloud resources for cloud-based machine learning activities. After program start, at 210, the method clusters the attributes of a data set according to the sensitivity of the attribute. In an embodiment, at least some attributes of the data set include a defined sensitivity. In this embodiment, the attribute sensitivity holds a value between 0 and 1. In other embodiments, the method uses alternative attribute sensitivity value scales. One of ordinary skill in the art will recognize that any attribute sensitivity scale which enable differentiation of attribute sensitivities is acceptable for use. In an embodiment, attribute sensitivity values are either 0 or 1. In an embodiment, the attribute sensitivity values range from 0 to 1.

In an embodiment, the attributes of the data set lack a defined sensitivity value. In this embodiment, the method determines a sensitivity value for each attribute. The method uses words, and phrases from external sources such as the GDPR, privacy policies, and data security classification documents to identify aspects of attributes related to attribute sensitivity. (e.g., the presence of personally identifiable information (PII) in an attribute.) The method parses documents in the data set using a natural language processor (NLP), seeking matches for the attributes gleaned from the policy and regulatory documents. In an embodiment, the method seeks matches for previously parsed documents known to have a defined sensitivity. In this embodiment, the method seeks matches for documents previously parsed and assigned a sensitivity.

In an embodiment, the method defines sensitivity according to an established sensitivity scale. For a binary scale of 0 and 1, the method defines attributes as having a sensitivity of either 0 or 1, and clusters the attributes based upon this division of sensitivity. In an embodiment, a sensitivity scale of between 0 and 1 enables the method to create buckets or segments, or classes of sensitivity by dividing the population of attributes according to their sensitivity. In an embodiment, the method divides the scale between 0 and 1 evenly into 3, 4, 5 or more segments. In an embodiment, the method divides the attributes evenly such that a third, quarter, fifth, or other fraction of the set of attributes falls into each defined segment. In this embodiment, the method computes the mean sensitivity for each segment of the overall scale and assigns the mean sensitivity for the segment to each attribute in the segment, and the segment itself.

In an embodiment, at 220, the method computes the resource allocation impact associated with transferring a defined portion of the attributes of a data set from the private cloud entity to the public cloud entity. In this embodiment, the impacts of allocating the data from the private to the public entity include the sensitivity level of the subject data (higher sensitivity—higher impact), data transfer cost associated with moving the data block based upon the block size (larger data blocks—higher costs), and a factor associated with the level of trust of the public cloud entity. In this embodiment, transfers to public cloud entities associated with a low level of trust have a higher impact factor than transfers to highly trusted public cloud entities. Public cloud entity trust levels are affected by factors including known data breaches, security, software, and hardware versions, and encryption schemes.

In an embodiment, the method determines the impact associated with each cluster contemplated for transfer as part of the data set portion as: the sensitivity of a cluster*the amount of data in the cluster*the costs of the data transfer* (1/trust of the public cloud) for each cluster in the contemplated transfer of data. The method then computes a sum of the impacts for the set of clusters of the data set portion. In this embodiment, the output of the impact computation is a total impact associated with the contemplated data transfer. In an embodiment, the output of the step is the sum of a set of impacts associated with the set of possible data cluster transfers.

In an embodiment, at 230, the method computes the information gains associated with data transfers from private to public cloud resources. In this embodiment, the method considers a cluster, one or more sets of clusters, or all clusters and computes the respective transfer information gains. In this embodiment, the information gains for each transfer are computed as a function of the information gain associated with adding the object of the contemplated transfer to the machine learning data set in the public cloud. In an embodiment, for clusters of attributes, the method computes the information gain of each attribute of the cluster and a mean information gain for the cluster. In this embodiment, the method computes the information gain for a set of clusters as the mean of the mean information gains for each cluster of the set. In an embodiment, the method computes the information gain of a set of attribute clusters as the mean of information gains of the individual attributes of the overall set of clustered attributes.

In an embodiment, at 240, the method formulates a reinforcement learning problem to evaluate outcomes associated with differing data attribute transfers and thereby optimize the allocation of resources. In this embodiment, the state space of the problem consists of attribute clusters, each cluster is a state in the space. In this embodiment, an agent starts at any state of the space. An action by the agent at any state S, is the transfer of the data of the state S, from the private to the public cloud resources. In this embodiment, the method computes the impact and information gain for each action as described above. In this embodiment, the method proceeds until the optimal impact-information gain combination is found together with the associate set of attributes to be transferred to the public cloud resources. In this embodiment, the optimized data transfer yields the maximum value for the ratio of information gain to impact of attribute transfer, or the maximum information gain per unit attribute transfer impact. All other possible transfers have a higher impact of attribute transfer to information gain ratio. In an embodiment, the method defines a threshold value for the ratio and transfers directly, or submits to the user for approval, all potential transfers exceeding the threshold value.

In an embodiment, at 250, the method copies the identified attributes associated with the optimized data transfer option to the public cloud resources and utilized in the public cloud machine learning activities. In an embodiment, the method provides identified attributes to a user or administrator for review and approval prior to the actual transfer to and use by the public cloud resources.

Figure 3:
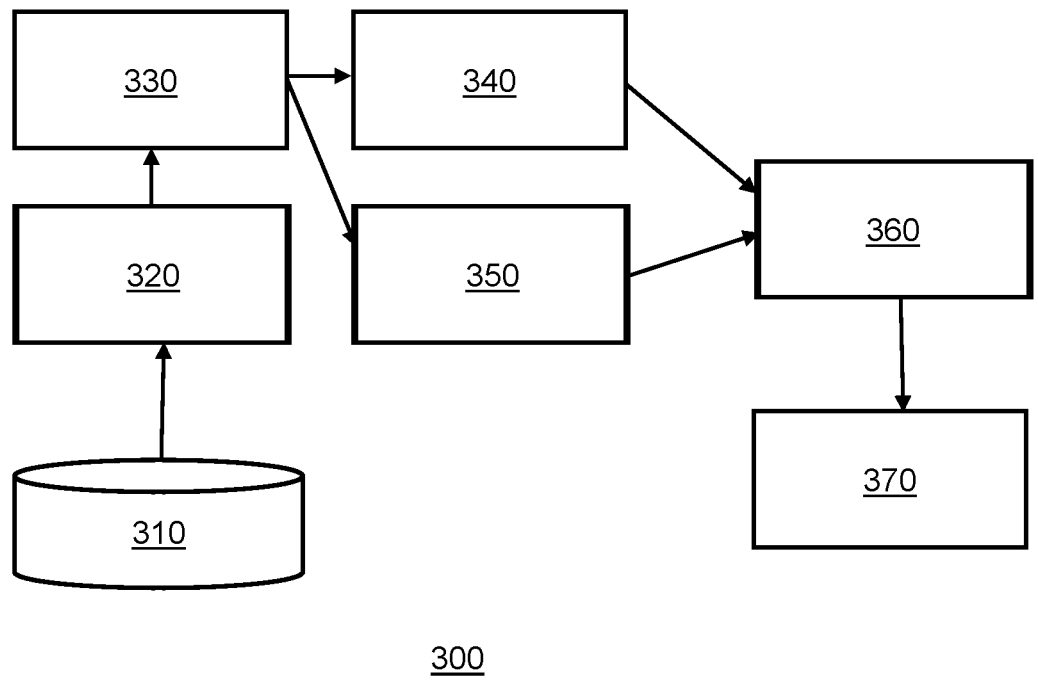
FIG. 3 provides a schematic representation of operational components, according to an embodiment of the invention.

Referring now to the system component schematic 300 of FIG. 3, in an embodiment, data is presented to the system from data storage component 310 (persistent storage element 170 of FIG. 1). In an embodiment, the method computes sensitivity values for the data at the system sensitivity component 320. In this embodiment, the method computes clusters of data according to the sensitivity values, using system clustering component 330. In this embodiment, the method passes computed clusters to the system information gain component 340, and system impact component 350, where the method computes information gains respectively. In this embodiment, the method passes the impacts and information gains to the system impact/information gain optimizing component 360, where the method determines which data is to be transferred to the public cloud resource for use in the machine learning. In this embodiment, the output of the optimizing component is passed to the system output component 370 where the method executes data transferring actions. In an embodiment, program 175 of FIG. 1 includes system components 320, 330, 340, 350, and 360. In this embodiment, data is transferred from a local private computer to a cloud resource over network element 114 of FIG. 1.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
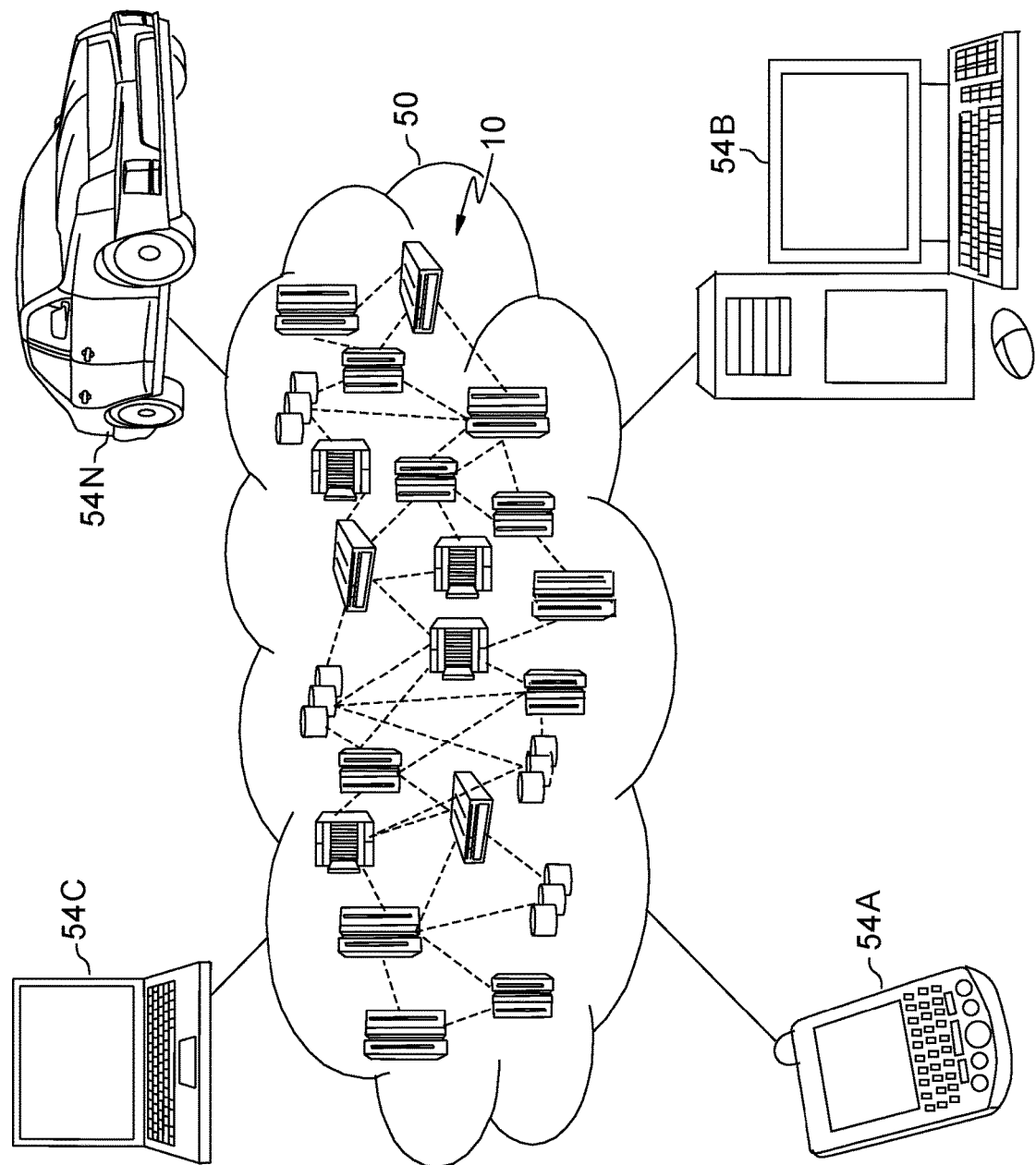
FIG. 4 depicts a cloud computing environment, according to an embodiment of the invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
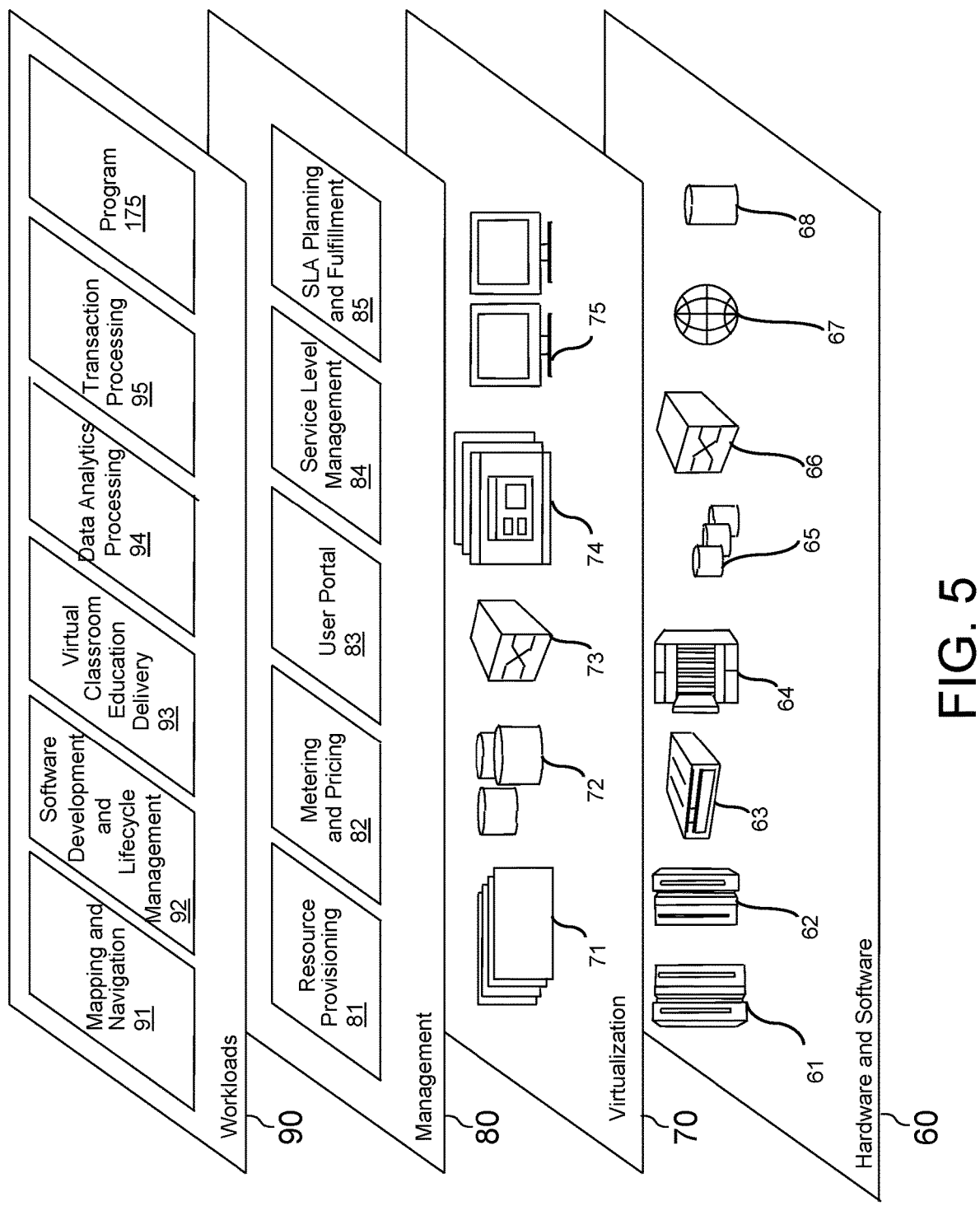
FIG. 5 depicts abstraction model layers, according to an embodiment of the invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide impact tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and resource allocation program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for managing hybrid cloud resources, the method comprising:
    clustering data elements of a data set according to attribute sensitivity into clusters of data elements;
    computing a resource allocation impact of transferring each of the clusters of data elements to public cloud resources;
    computing an information gain associated with the transferring of each of the clusters of data elements to a machine learning data set in the public cloud resources;
    allocating cloud resources according to the resource allocation impact and the resource information gain.

2. The computer implemented method according to claim 1, further comprising determining the attribute sensitivity.

3. The computer implemented method according to claim 1, wherein the resource allocation impact is computed according to the attribute sensitivity, data cluster size, data transfer cost, and trust of a public cloud of the public cloud resources.

4. The computer implemented method according to claim 1, wherein the information gain is computed as a mean of mean information gains of each of the clusters of data elements of the data set.

5. The computer implemented method according to claim 1, further comprising optimizing attribute transfer according to a reinforcement learning problem.

6. The computer implemented method according to claim 1, further comprising transferring at least one of the clusters of data elements to the public cloud resources.

7. The computer implemented method according to claim 1, further comprising:
    determining the attribute sensitivity including a sensitivity value of each of the data elements relating to confidentiality of the data elements and a desire to maintain security of the data elements to maintain a business advantage;
    optimizing attribute transfer according to a reinforcement learning problem evaluating outcomes associated with differing data attribute transfers for optimization of the allocating of the cloud resources; and
    transferring the data elements to the public cloud resources.

8. A computer program product for managing hybrid cloud resources, the computer program product comprising one or more computer readable storage devices and stored program instructions on the one or more computer readable storage devices, the stored program instructions comprising:
    program instructions to group at least a portion of data elements of a data set according to attribute sensitivity into a cluster of data elements;
    program instructions to compute a resource allocation impact of transferring of the cluster of data elements from a private cloud entity to a public cloud entity;
    program instructions to compute an information gain associated with the transferring of the cluster of data elements, the information gain is from adding the cluster to a machine learning data set in the public cloud; and
    program instructions to allocate cloud resources according to the resource allocation impact and the information gain.

9. The computer program product according to claim 8, further comprising program instructions to determine the attribute sensitivity by parsing documents in the data set to identify matches to policies and regulatory documents,
    program instructions to compute the information gain of the attribute sensitivity of the cluster and a mean information gain for the cluster,
    program instructions to determine that transferring the cluster is worthwhile based on the attribute sensitivity, the resource allocation impact, and the information gain, and
    program instructions to transfer the cluster of data elements to the public cloud entity for use by a machine learning element.

10. The computer program product according to claim 8, wherein the resource allocation impact is computed according to the attribute sensitivity, data cluster size, data transfer cost, and trust of the public cloud entity.

11. The computer program product according to claim 8, wherein the information gain is computed as a Kullback-Leibler divergence representing an amount of change in the computed information gain between an initial probability distribution and a subsequent probability distribution.

12. The computer program product according to claim 8, further comprising program instructions to optimize attribute transfer according to a reinforcement learning problem.

13. The computer program product according to claim 8, further comprising program instructions to transfer the cluster of data elements to the public cloud entity.

14. The computer program product according to claim 8, further comprising program instructions to:
   determine the attribute sensitivity;
   optimize attribute transfer according to a reinforcement learning problem; and
   transfer the cluster of data elements to the public cloud entity.

15. A computer system for managing hybrid cloud resources, the computer system comprising:
   one or more computer processors;
   one or more computer readable storage devices; and
   stored program instructions on the one or more computer readable storage devices for execution by the one or more computer processors, the stored program instructions comprising:
   program instructions to group at least a portion of data elements of a data set according to attribute sensitivity into a cluster of data elements;
   program instructions to compute a resource allocation impact of transferring the cluster of data elements to public cloud resources;
   program instructions to compute an information gain associated with the set transferring of the cluster of data elements, the information gain being computed from a difference between an initial probability distribution for the data elements in the data set that are in a public cloud prior to the transferring of the cluster of data elements to the public cloud resources and a subsequent probability distribution for an initial data set expanded by the cluster of data elements; and
   program instructions to allocate cloud resources according to the resource allocation impact and the information gain.

16. The computer system according to claim 15, further comprising program instructions to determine the attribute sensitivity utilizing an attribute sensitivity scale to place a value on the attribute sensitivity of each of the data elements.

17. The computer system according to claim 15, wherein the resource allocation impact is computed according to the attribute sensitivity, data cluster size, data transfer cost, and trust of a public cloud of the public cloud resources.

18. The computer system according to claim 15, wherein the information gain is computed as a mean information gain of the cluster of data elements.

19. The computer system according to claim 15, further comprising program instructions to optimize attribute transfer according to a reinforcement learning problem yielding a maximum value for ratio of the information gain to the resource allocation impact.

20. The computer system according to claim 15, further comprising program instructions to transfer data elements to the public cloud resources.

* * * * *